UNITED STATES PATENT OFFICE.

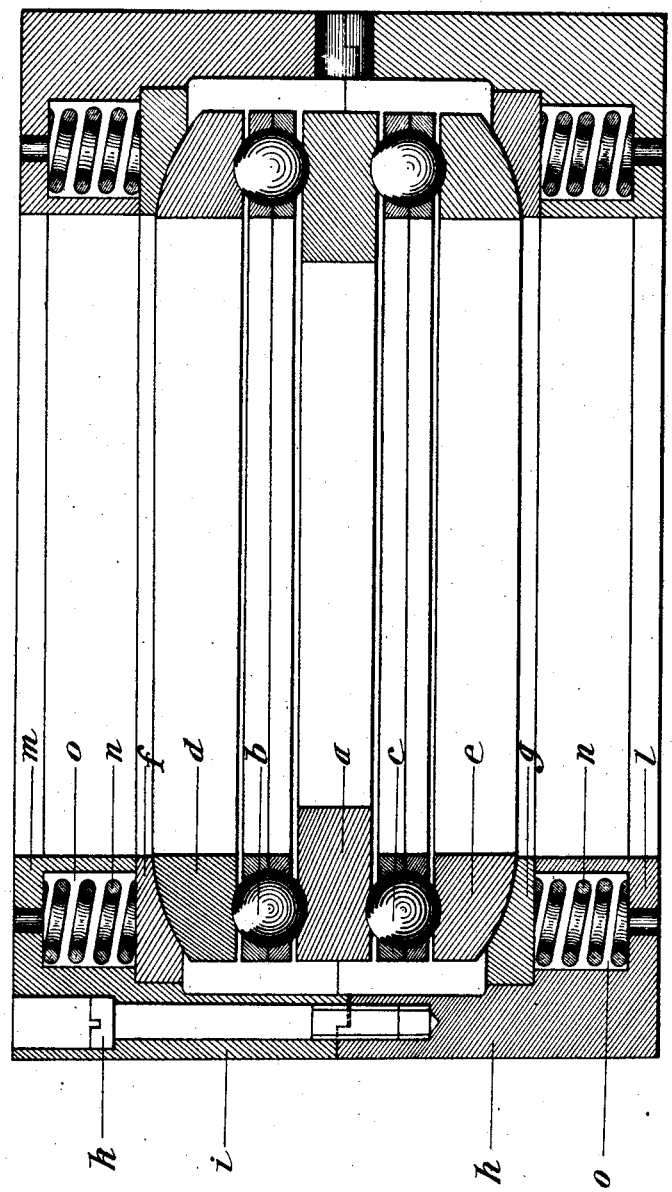

MAX GOHLKE, OF PANKOW, NEAR BERLIN, GERMANY.

BALL-BEARING.

1,391,379.  Specification of Letters Patent.  Patented Sept. 20, 1921.

Application filed May 23, 1919. Serial No. 299,376.

*To all whom it may concern:*

Be it known that I, MAX GOHLKE, a citizen of the German Republic, residing at Florastrasse 5/6, in the city of Pankow, near Berlin, Germany, have invented certain new and useful Improvements in Ball-Bearings, (for which I have filed applications in Germany, Sept. 27, 1916, and Norway, Jan. 18, 1918,) of which the following is a specification.

In existing double-acting two-row ball thrust bearings it is, in certain cases, necessary to provide for a bearing pressure by means of springs or the like elastic means against the rings when one or the other row of balls only is loaded, so as to prevent the temporarily unloaded row from being subjected to injurious influences.

The selection and the fitting of such springs and the proper assembling of the associated bearing requires a certain experience, skill and care on the part of the fitter. The disadvantages caused thereby in the manufacture of such thrust-bearings are obviated according to the present invention by the said bearing being inclosed under tension in a two-part casing in such a manner that it is possible both for the tension to be regulated and for the bearing to be adjusted in a direction parallel to its axis. According to the present invention this adjustment is effected by means of screws distributed over the circumference of said casing and holding its sections together. These screws may be independently adjusted.

In the accompanying drawing the present invention is exemplified in a constructional form, shown in section.

The double-acting ball thrust bearing composed of the runner ring $a$ in the middle, the two rows of balls $b$, $c$, the outer rings $d$, $e$ and the bearing rings $f$, $g$, are fitted in a casing composed of the parts $h$ and $i$; these parts $h$ and $i$ are held together by means of screws $k$, which allow of an adjustment. Between the outer faces of the bearing rings $f$, $g$, and the faces $l$, $m$, of the casing sections $h$, $i$, springs $n$ are inserted in holes or sockets $o$ drilled into the said faces $l$, $m$. These springs $n$ are compressed when the screws $k$ are tightened, so that they exert continuous axial pressure on the members of the ball-bearing $f$, $d$, $b$, $a$, $c$, $e$, $g$. As the said springs $n$ are fitted into the casing sections $h$, $i$, and not into any parts of the ball-bearing itself, it is possible to fit into the casing any existing two-row double-acting ball thrust bearing, provided only it outer diameter and its width correspond to the dimensions of the cavity of the casing. The casing itself is a cylindrical body, the outside dimensions of which may be adapted to the dimensions of the respective machine parts. As will be evident from the drawing it is possible, by tightening or loosening the screws $k$ to adjust both the spring-pressure as also the direction of the bearing rings relatively to the axis of the bearing in a manner corresponding exactly to the respective requirements.

Having described my invention, the following is what I claim as new and desire to secure by Letters Patent:

1. The combination, with a ball thrust bearing unit comprising two rows of balls, an interposed runner ring, an outer race ring associated with each of said rows, and a bearing ring engaging each race ring; of a two-part casing wherein the bearing unit is rotatably inclosed, the casing parts being formed with series of registering screw holes; springs interposed between the bearing rings and the adjacent walls of the casing parts to constantly exert pressure upon said bearing rings; and screws adjustably engaged in the registering screw holes to fasten the casing parts together and to regulate the tension of the springs.

2. The combination, with a ball thrust bearing unit comprising two rows of balls, an interposed runner ring, an outer race ring associated with each of said rows, and a bearing ring engaging each race ring; of a two-part casing wherein the bearing unit is rotatably inclosed, each of the casing parts being formed with a series of inwardly-opening internal sockets, and said parts being also formed with series of registering screw holes; springs fitted in said sockets and bearing at their exposed ends against the bearing rings; and screws adjustably engaged in the registering screw holes to fasten the casing parts together and to regulate the tension of the springs.

In testimony whereof I have affixed my signature.

MAX GOHLKE.